United States Patent [19]

Locher

[11] 4,292,658
[45] Sep. 29, 1981

[54] MONITOR APPARATUS FOR ELECTRICAL CIRCUITS WITH VIRTUAL RESISTANCE

[75] Inventor: Johannes Locher, Stuttgart, Fed. Rep. of Germany

[73] Assignee: Robert Bosch GmbH, Stuttgart, Fed. Rep. of Germany

[21] Appl. No.: 11,022

[22] Filed: Feb. 9, 1979

[30] Foreign Application Priority Data

Feb. 11, 1978 [DE] Fed. Rep. of Germany ....... 2805876

[51] Int. Cl.³ ...................... H02H 03/08; F02B 03/08
[52] U.S. Cl. .................................... 361/93; 361/187; 361/31
[58] Field of Search ..................... 361/93, 95, 100, 31, 361/187, 188; 123/32 EK, 32 EE, 198 D

[56] References Cited

U.S. PATENT DOCUMENTS 4,176,626 12/1979 Norimatsu et al. ............ 123/32 EE

FOREIGN PATENT DOCUMENTS 2646809 4/1978 Fed. Rep. of Germany ........ 361/93

Primary Examiner—J. D. Miller
Assistant Examiner—L. C. Schroeder
Attorney, Agent, or Firm—Edwin E. Greigg

[57] ABSTRACT

In order to prevent dangerous operation of machinery, for example excessive speeds in internal combustion engines upon electrical failure in the fuel management system or associated sensors, the current passing through the electromagnetic final control element which engages the fuel control rod is monitored. In normal operation of the final control element, when the armature is displaced, a back EMF opposes the applied voltage, thereby reducing the effective current. Accordingly, a jammed armature and similar malfunctions will produce increased current through the final control element. The threshold of a threshold response switch is set to lie between these two values of the current, whereby, when the armature is jammed or short circuits occur, the current will rise above the threshold and permit fuel shut-off or a switchover to mechanical fuel control. Another embodiment of the invention monitors the output voltage of a position transducer associated, for example, with the fuel control rod of the engine and initiates emergency procedures when the signal departs from its nominal range in one direction.

6 Claims, 8 Drawing Figures

MONITOR APPARATUS FOR ELECTRICAL CIRCUITS WITH VIRTUAL RESISTANCE

FIELD OF THE INVENTION

The invention relates to apparatus for monitoring the operation of electrical devices and circuits, for example sensors and control elements, and to generate a signal when the current or voltage, i.e., the virtual resistance of the devices, exceeds predetermined limits.

BACKGROUND OF THE INVENTION

Apparatus for monitoring the output signal of electrical fuel control systems for internal combustion engines is known. In the known apparatus, the deviations of a final control element from a nominal value are fed to an integrator which generates an error signal if the integrated value exceeds a predetermined limit. The known apparatus is incapable of optimum performance because the time constants of the integrator must be kept fairly small so as to permit consideration of rapid changes in the integrated values.

OBJECT AND SUMMARY OF THE INVENTION

It is thus a principal object of the present invention to provide an electrical monitoring apparatus which responds promptly and universally to the magnitude of the signals which are to be held within predetermined limits.

This and other objects are attained according to the invention by providing at least one threshold switch which is connected to electrical lines attached to the sensor or the electrical control element and feeding the output signal from the threshold switch to an emergency control circuit which overrides the position of the final control element.

In the preferred feature of the invention, the actuating current of the solenoid in the final control element is monitored and express use is made of the fact that, under normal conditions, the movable armature will limit the actuation current. Thus, if the actuation current exceeds a given threshold, it may be assumed that the armature is unable to perform its normal displacement, thereby indicating a malfunction.

The invention will be better understood as well as further objects and advantages thereof become more apparent from the ensuing detailed description of a number of exemplary embodiments taken in conjunction with the drawing.

DESCRIPTION OF THE PREFERRED EMBODIMENTS

Preliminary Considerations

When internal combustion engines and other systems are subject to automatic control, for example by electronically operating fuel metering systems, for example those used in conjunction with fuel injection pumps, it is of great importance to prevent excessive engine variables, for example excessive speed, due to defects in the electronic circuitry and possibly in the final control elements. Generally, the variable to be limited becomes dangerous only in one particular direction, for example the engine speed, and the function of the monitor circuit according to the invention is to determine the occurrence of a unilateral excursion of a current or voltage within the control system which, if permitted to prevail, might lead to a dangerous adjustment of the controlled system, i.e., the internal combustion engine. However, the complexity of the monitor circuit should necessarily be low so as to prevent an increased probability of failure. When the invention is applied to an electronic fuel injection system, dangerous operation may be prevented, for example, by complete shut-off of fuel injection or by overriding the automatic features of a hybrid electromechanical system.

Figure 1:
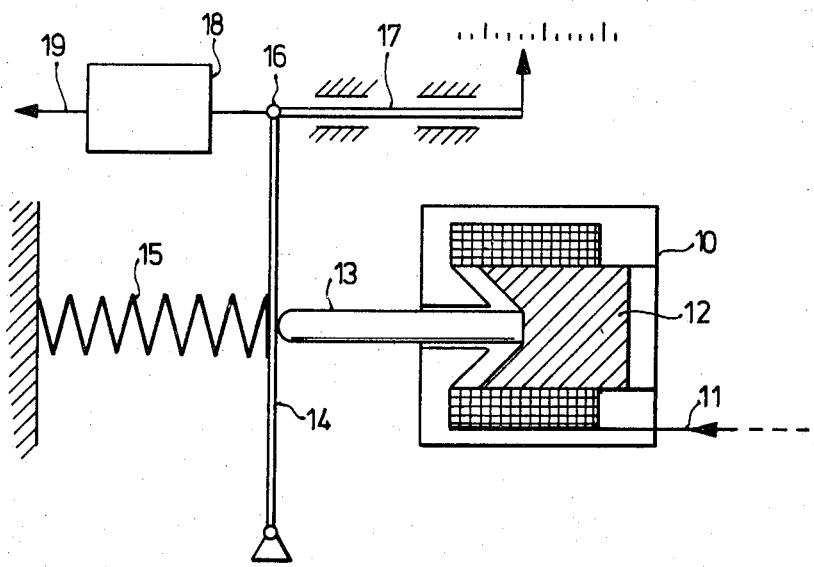
FIG. 1 is an overall diagram illustrating a fuel control system of an internal combustion engine subject to a final control element whose operation is to be monitored by an apparatus of the invention.

FIG. 1 is an overall diagram of such a system in which an electromagnetic final control element 10 engages the fuel control rod 17 of a fuel injection pump, not shown. The position of the fuel control rod 17 is indicated by a position indicator 18 which applies its signal at an output contact 19. The electromagnetic final control element 10 has an armature 12 which engages an actuation pin 13 whose motion is resisted by a compression spring 15. The actuation signal for the solenoid is applied on a line 11.

Figure 2:
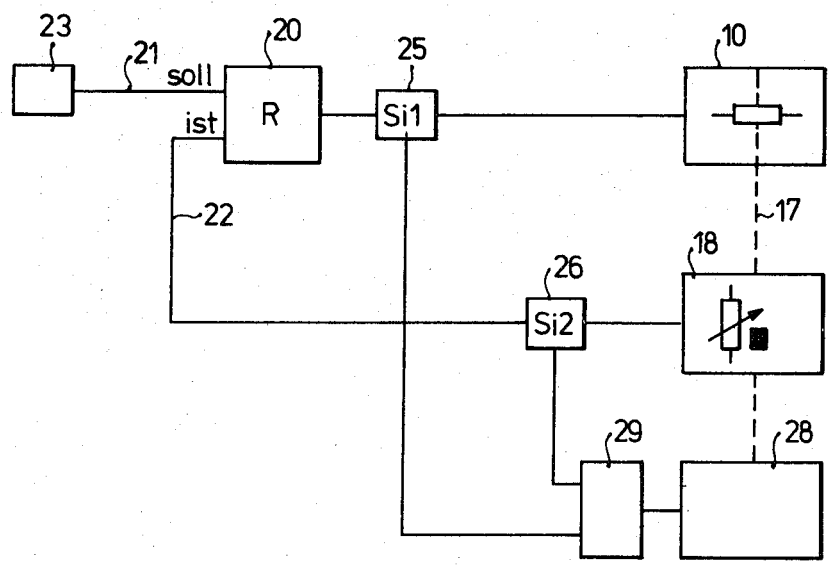
FIG. 2 is an overall block diagram of an electrical monitor device for a control system.

The overall control system is illustrated in the diagram of FIG. 2 which also includes the points at which the apparatus of the invention engages the system. The electrical controller 20 receives a set-point value on the line 21 from a suitable set-point generator 23 and it further receives an actual value of the final control element 10 via a line 22. The set-point generator 23 may be, for example, a suitably equipped accelerator pedal of the vehicle in which the engine is placed. A current monitoring device 25 is placed astride the line leading from the controller to the final control element 10. The position of the final control element, for example the fuel control rod 17 of FIG. 1, is indicated by the position indicator 18 whose output signal is applied to the aforementioned actual value input 22 of the controller 20. Its value is monitored by a signal monitor 26. The outputs of the first and second signal monitors 25 and 26 are applied to respective inputs of an emergency switching circuit 29 which, when actuated, engages an emergency function generator 28 that suitably overrides the control position of the final control element 10, for example by moving the fuel control rod 17 in the direction of shut-off whenever the final control element 10 or the position detector 18 are determined to be operating incorrectly by the associated monitor circuits 25 and 26, respectively. Depending on the construction of the overall system, the final control element 10 may move the fuel control rod 17 directly or may cause the automatic fuel control mechanism to be defeated, thereby returning the fuel control system to basic mechanical control.

Figure 3:
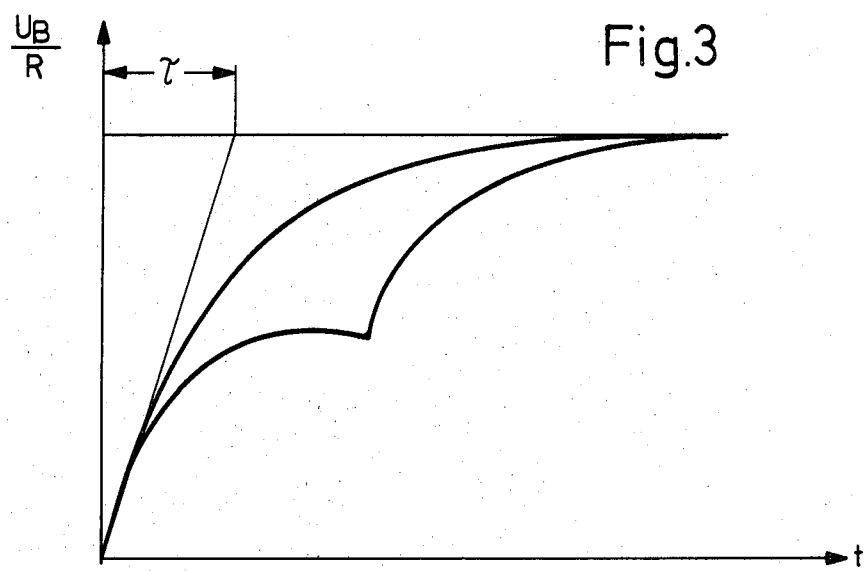
FIG. 3 is a diagram illustrating the current as a function of time in an electromagnetically actuated final control element.
Figure 5:
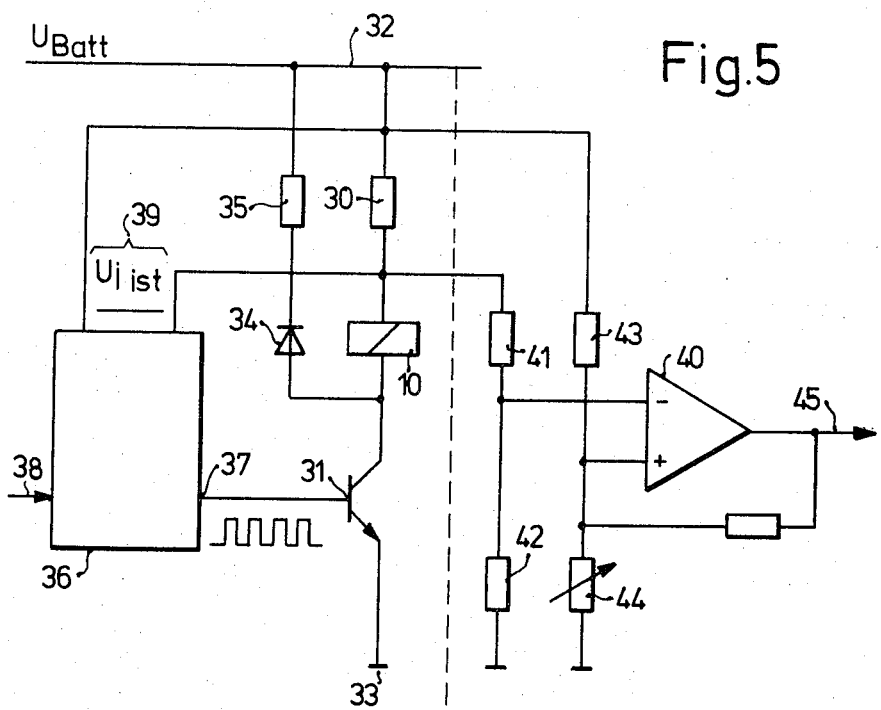
FIG. 5 is a detailed circuit diagram of a first embodiment of a current monitor according to the invention.

It is a common feature of magnetic control elements to be so dimensioned as to still respond adequately when the operating voltage, i.e., the vehicle battery voltage, drops to 50% of the nominal value. In order to prevent excessive currents when the battery voltage is normal, the actuation of these final control elements is normally cyclic, i.e., at less than 100% duty cycle. The cyclic operation has several advantages, among these are that the power loss in the final control element is reduced, the control behavior is improved due to the rapid current changes and the control element remains operative even when the actuating voltage undergoes wide swings. In order to take advantages of these features, the control system employs a current-controlled actuation provided, for example, by a per se known current controller 36 (FIG. 5). The current provided to the final control element 10 by the current controller 36 is monitored on the basis of the following principle. When the movable armature 12 of the final control element 10 is being displaced, the inductance and the ohmic resistance define a counter EMF which opposes the applied potential and decreases the rate at which the current can increase to a value which is consistently below the value which would occur if the armature were stationary. This behavior is illustrated in the diagrams of FIG. 3 in which the top curve shows the current through the solenoid coils when an operating voltage is applied abruptly. The top curve illustrates the current when the armature is stationary and the first part of the bottom curve illustrates the current when the armature is moving. At the inflection point of the bottom curve, the armature has reached its maximum displacement, thereby becoming stationary, whereupon the current is suddenly able to increase further due to the absence of an opposing EMF. Finally, the current joins the common asymptote denfining a purely ohmic resistance. It is a principal feature of the present invention to exploit the fact that, under normal conditions, the actuating current of the solenoid will never reach its equilibrium asymptotic value. Accordingly, if the response threshold of the monitor is placed in the vicinity of the asymptote, its response will indicate an actual malfunction. A malfunction may be due to a number of circumstances among which are jamming of the armature or some mechanical member coupled thereto, a short circuit in the solenoid coils, permitting an abnormal increase of the current, a continuously actuated output transistor due to an inherent transistor failure or some failure in the pulsing mode of the controller or long-term deviations between the nominal and set-point values of the final control element. In all these cases, the currents flowing through the solenoid would be larger than those flowing during normal operation.

It is a feature of the present invention to become effective only when the current becomes excessive. It may be possible that the system and the associated engine would respond unfavorably to lower-than-normal currents but this would not result in dangerous operation and thereby does not become a situation in which the monitor device of the invention becomes effective.

Figure 4:
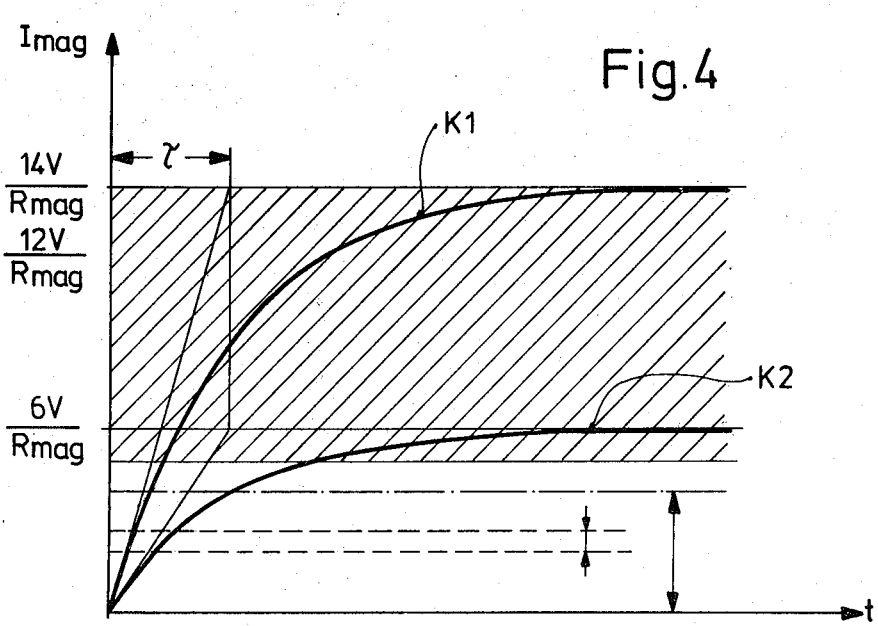
FIG. 4 is a diagram illustrating the current through a final control element as a function of time for two different operational voltages.

The principle of current monitoring is further illustrated in the diagram of FIG. 4. The two solidly drawn curves illustrate the current as a function of time for two different actuation voltages, namely 6-volt and 12-volt, respectively. The shaded region defines the currents which are regarded as abnormal from the point of view of the present invention. Thus, the normal operating current of the solenoid is expected to lie below the saturation static current at an operating voltage of only 50% of the nominal value.

The maximum current which the magnetic final control element receives in normal operation is drawn in FIG. 4 as horizontal dashed lines and dash-dotted lines. In substantially stationary operation, i.e., when the final control element maintains a given position, the current is relatively small and lies within the range defined by the two parallel dashed lines. In dynamic operation, i.e., when the final control element is expected to change its position, the current may rise from a value of zero up to a maximum value which lies somewhere between the region of stationary operation and the lower threshold of the monitoring range which is shown by the crosshatching. It may thus be desirable to operate at two different monitoring thresholds, one being associated with the substantially stationary operation and another for the dynamic region. The switchover from one of these thresholds to the other may be accomplished, for example, by switchable threshold switches.

However, in the embodiment whose operation is illustrated in FIG. 4, only the single monitor threshold is used at relatively elevated values of the current. Accordingly, the monitor circuit engages the final control element system only when the current exceeds the predetermined value but takes no action when the current falls below a particular level. However, this unilateral response is suitable for protecting the engine against dangerous and destructive operation which would not ensue when the current falls below a desirable value and, furthermore, this one-sided response tends to diminish the complexity and cost of the monitoring apparatus.

FIG. 5 is a circuit diagram of one embodiment of a monitoring apparatus according to the invention in association with an electromagnetic final control element such as the structure 10 in FIG. 1. This element lies in series with a measuring resistor 30 as well as with the collector-emitter path of a transistor 31, all of which are connected between two poles 32 and 33 of a suitable electric power source. A resistor 35 and a diode 34 lie in parallel with the measuring resistor 30 and the solenoid of the final control element 10. The transistor 31 is controlled by the output 37 of a current regulator 36 of known construction which generates a pulse-width modulated signal. An input 38 of the current regulator 36 receives signals related to operational variables of the system while a pair of inputs 39 is connected across the aforementioned measuring resistor 30, thereby monitoring the current flowing through the measuring resistor 30.

The monitor circuit depicted in FIG. 1 also includes a threshold amplifier 40 having two inputs each of which is connected to the junction of a voltage divider consisting of resistors 41 and 42 in one branch and resistors 43 and 44 in the other branch. These two voltage dividers are also connected across the measuring resistor 30. The output 45 of the monitor circuit may be applied to an emergency control element, not shown in the figure, but illustrated generally as the element 29 in FIG. 2 and discussed in connection therewith.

Figure 6:
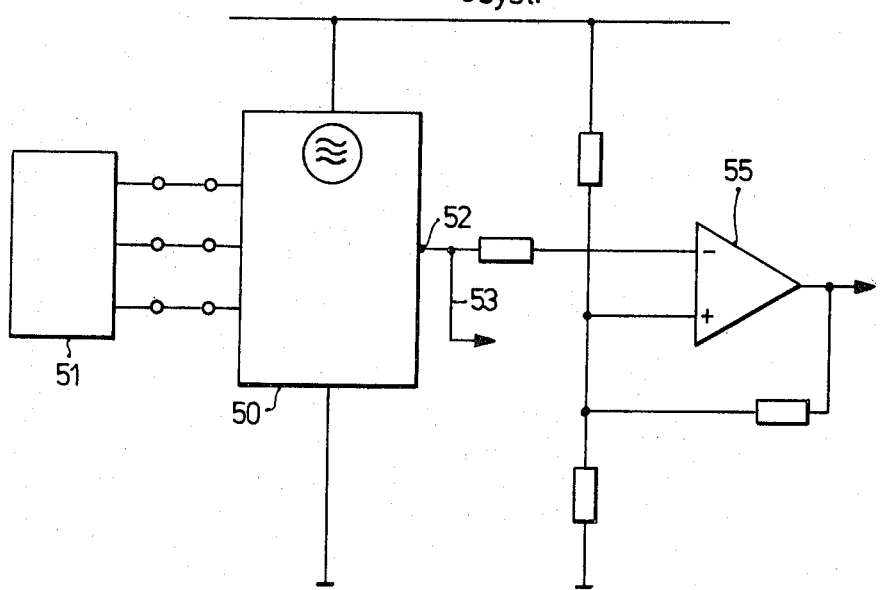
FIG. 6 is a circuit diagram of a monitor for an inductive control path indicator.

FIG. 6 is a detailed circuit diagram of an embodiment of the monitor circuit of the invention when applied to monitor the operational status of, for example, a position indicator. In this connection, inductive position indicators have been found to be most suitable. These transducers tend to be susceptible to malfunctions due to the presence of plugs, receptacles and other contacts.

In order to prevent a control system malfunction due to an erroneous signal from these position transducers, it is desirable to monitor their behavior in the manner indicated in the exemplary embodiment of FIG. 6. This embodiment includes a position transducer 51 of per se known construction and powered, for example, by alternating current and associated with a mechanical element of the system in such a way that for example the amplitude of the output signal from the transducer 51 is related to, for example proportional to, the displacement of the associated mechanical element. The transducer signal is fed to a signal processor 50, also of known construction, which generates a signal related to the transducer signal and suitable for engaging further system components. The signal present at the output 52 is also applied to one input of an operational amplifier 55, connected as a threshold switch, having a second input provided with a defined set-point voltage by a voltage divider. When the signal at the output 52 crosses the threshold of the switch 55, the output signal of the amplifier 55 may be used to, for example, shut off the fuel to the engine or revert the controller to a basic mechanical mode of operation.

For example, a known position transducer uses an operational voltage of approximately 10 volt and the output signal of the processor circuit 50 varies between 2 and 8 volts. If one of the supply wires for the transducer breaks or if two or more wires are short-circuited with respect to one another or with respect to one of the supply lines, the output voltage exceeds the normal range of 2–8 volts. Generally, the excursion of position transducers will be such that only one of the possible directions will result in dangerous operation of the system. Accordingly, the system embodied in FIG. 6 also has only a single threshold switch.

In a complex system, a variety of electrical signals may be monitored, in at least one direction leading to catastrophic failure, by the combination of several threshold levels. If these levels are switched, for example by diodes in the sense of an OR-type logic, only a single threshold switch is required. If the design is such that the polarity of the control signals cannot be kept either positive or negative during normal operation, it may be necessary to provide two threshold switches or an inversion circuit.

Figure 7:
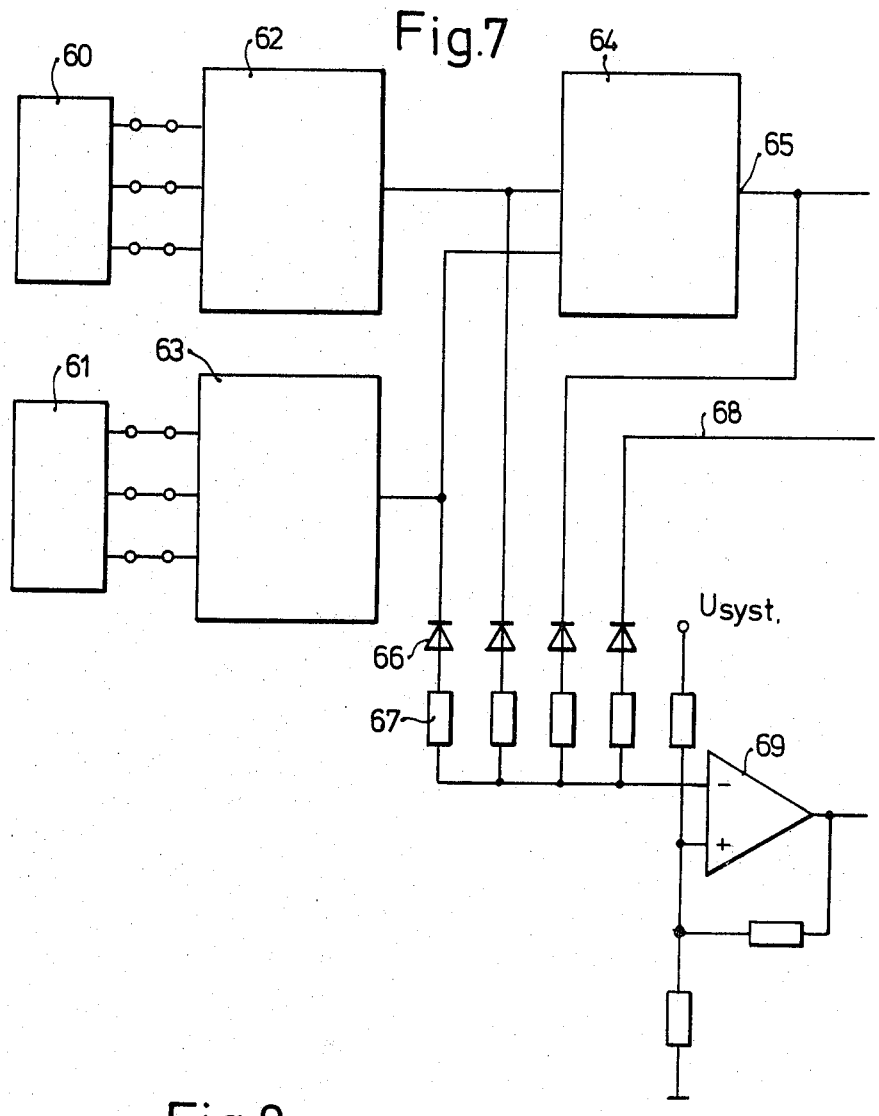
FIG. 7 is a circuit diagram illustrating the connection of a multiplicity of monitor circuits.

An example of a multiple monitoring circuit is embodied in the illustration of FIG. 7. Shown there are two transducers 60 and 61, each coupled to associated processor circuits 62 and 63. The outputs of the latter are applied to a junction circuit 64 which may also contain a data field. An output 65 of the junction circuit 64 is then used to engage other elements of the control system.

Each of the outputs of the processor circuits 62 and 63 as well as the output of the junction circuit 64 is connected to one input of a threshold switch 69 via the series connection of a diode 66 and a resistor 67. A further series connection of a diode and resistor such as 66 and 67 permits a line 68 to receive additional signals. By suitably dimensioning the values of the pairs of resistors and diodes, different threshold levels may be defined which, when exceeded by the signals on the line connected thereto, will cause a switchover of the threshold switch 69.

Figure 8:
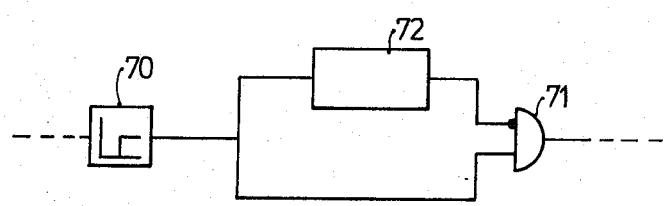
FIG. 8 is a partial circuit diagram of a circuit for eliminating responses to short-term inputs to the monitor circuit.

It may be desirable to suppress a response of the threshold switch when the input pulse is very short so as to prevent unnecessary engagement of the fuel metering system. A suppressor circuit of this type may be embodied as illustrated in FIG. 8 in which a threshold switch 70, for example as the threshold switch 40 in FIG. 5, has an output applied directly to one input of an AND gate 71 and indirectly, via a timing circuit 72, to a negating input of the same AND gate 71. Whenever the threshold switch 70 generates a positive output signal, the timing circuit 72, for example a monostable multivibrator, is triggered over into its unstable state. The output signal of the timing circuit 72 then becomes positive so that the output of the AND gate 71 continues to be low because both of its inputs are at the same level. However, if the output signal of the threshold switch 70 is still high when the timing circuit 72 changes back to its stable state, the output of the AND gate 71 changes, thereby transmitting an actuation signal to the emergency override controls of the system. If, at the time of the switch back of the timer 72, the output of the threshold switch 70 has disappeared, no response will be transmitted.

A similar result might be obtained, for example, by passing the input to the threshold switch 70 through a low pass filter.

The foregoing relates to preferred exemplary embodiments of the invention, it being understood that other embodiments and variants thereof are possible within the spirit and scope of the invention.

What is claimed and desired to be secured by Letters Patent of the United States is:

1. A monitoring apparatus for electrical devices, especially for sensors and control elements associated with the fuel management system of an internal combustion engine, wherein one control element to control operation of the fuel management system includes an electromagnetic and movable armature, said control element exhibiting inductance, whereby the current passing through said control element is diminished during motions of said armature, said monitoring apparatus comprising:
   at least one threshold switch for comparing electrical signals from said sensors and control elements having a threshold value and for actuating said control elements when the value of said signals exceeds the threshold value, and wherein the improvement comprises that the actuation current of said control element lies between zero and the threshold value.

2. A monitoring apparatus according to claim 1, wherein said threshold switch responds only if the electrical signal varies from said threshold in one direction, said one direction being the direction which would result in hazardous operation of a machine controlled by said electrical devices, especially said internal combustion engine.

3. A monitoring apparatus according to claim 1, wherein the threshold of said threshold switch is adjustable.

4. A monitoring apparatus according to claim 3, wherein said threshold is adjustable on the basis of operational variables of said machine.

5. A monitoring apparatus according to claim 1, further comprising a timing circuit connected behind said threshold switch, whereby the response to said threshold switch is delayed and short-term actuation of said control element is prevented.

6. A monitoring apparatus for electrical device, especially for sensors and control elements associated with the fuel management system of an internal combustion engine, wherein one control element to control operation of the fuel management system includes an electromagnetic and movable armature, said control element exhibiting inductance, whereby the current passing through said control element is diminished during motions of said armature, said monitoring apparatus comprising:

at least one threshold switch for comparing electrical signals from said sensors and control elements having a threshold value and for actuating said control elements when the value of said signals exceeds the threshold value, and wherein the improvement comprises that the actuation current of said control element is less than the threshold value during static mode, and wherein the actuation current of said control element during dynamic mode is between zero and a value which is between the threshold value and the static mode actuation current.

* * * * *